United States Patent
Jaldanki et al.

(10) Patent No.: US 10,924,029 B2
(45) Date of Patent: Feb. 16, 2021

(54) CIRCULATING CURRENT CONTROL IN A MODULAR MULTILEVEL VOLTAGE SOURCE CONVERTER

(71) Applicant: ABB Power Grids Switzerland AG, Baden (CH)

(72) Inventors: Sivaprasad Jaldanki, Chennai (IN); Swakshar Ray, Chennai (IN)

(73) Assignee: ABB POWER GRIDS SWITZERLAND AG, Baden (CH)

( * ) Notice: Subject to any disclaimer, the term of this patent is extended or adjusted under 35 U.S.C. 154(b) by 0 days.

(21) Appl. No.: 16/329,670

(22) PCT Filed: Sep. 1, 2016

(86) PCT No.: PCT/EP2016/070639
§ 371 (c)(1),
(2) Date: Feb. 28, 2019

(87) PCT Pub. No.: WO2018/041358
PCT Pub. Date: Mar. 8, 2018

(65) Prior Publication Data
US 2019/0199213 A1    Jun. 27, 2019

(51) Int. Cl.
*H02M 7/483*    (2007.01)
(52) U.S. Cl.
CPC .... *H02M 7/483* (2013.01); *H02M 2007/4835* (2013.01)
(58) Field of Classification Search
CPC ........ H02M 7/797; H02M 1/12; H02M 7/483; H02M 7/49; H02M 7/7575; H02M 2007/4835
See application file for complete search history.

(56) References Cited

U.S. PATENT DOCUMENTS

2011/0261598 A1    10/2011    Harnefors et al.

FOREIGN PATENT DOCUMENTS

| WO | WO 2010/091720 A1 | 8/2010 |
| WO | WO 2011/026927 A1 | 3/2011 |
| WO | WO 2014/111595 A1 | 7/2014 |

OTHER PUBLICATIONS

Chu et al., "A Novel Circulating Current Suppressing Method of Modular Multilevel Converter," 2014 IEEE Conference and Expo Transportation Electrification Asia-Pacific, IEEE, Aug. 31, 2014, pp. 1-5.

(Continued)

*Primary Examiner* — Peter M Novak
(74) *Attorney, Agent, or Firm* — Slater Matsil, LLP

(57) ABSTRACT

A modular multilevel voltage source converter and a method and computer program product for handling circulating currents in such a modular multilevel voltage source converter are described. A control unit of the voltage source converter determines a circulating current control signal contribution ($E_{R1}-E_{R2}+2V_{CM}$) for a phase leg based on the sum of cell voltages in the upper phase arm of the phase leg, the sum of cell voltages in the lower phase arm of the phase leg and at least one modulation reference and combines the circulating control signal contribution with a modulation reference used for one of the phase arms in order to obtain a modified voltage reference for controlling the phase arm to handle a circulating current while a waveshape is formed.

21 Claims, 5 Drawing Sheets

(56) References Cited

OTHER PUBLICATIONS

International Preliminary Report on Patentability issued in PCT/EP2016/070639, dated Dec. 4, 2018.
International Search Report issued in PCT/EP2016/070639, dated May 4, 2017.
Li et al., "An Inner Current Suppressing Method for Modular Multilevel Converters," IEEE Transactions on Power Electronics, vol. 28, No. 11, Nov. 2013, pp. 4873-4879.
Pérez et al., "Decoupled Current Control of Modular Multilevel Converter for HVDC Applications," IEEE, 2012, pp. 1979-1984.
She et al., "AC Circulating Currents Suppression in Modular Multilevel Converter," IECON 2012—38th Annual Conference on IEEE Industrial Electronics Society, IEEE, Oct. 25, 2012, pp. 191-196.
Written Opinion of the International Preliminary Examining Authority issued in PCT/EP2016/070639, dated Aug. 23, 2018.
Written Opinion of the International Searching Authority issued in PCT/EP2016/070639, dated May 4, 2017.
Zhang et al., "Interlinking Modular Multilevel Converter of Hybrid AC-DC Distribution System with Integrated Battery Energy Storage," IEEE, 2015, pp. 70-77.

CIRCULATING CURRENT CONTROL IN A MODULAR MULTILEVEL VOLTAGE SOURCE CONVERTER

FIELD OF INVENTION

The present invention relates to a modular multilevel voltage source converter and a method and computer program product for handling circulating currents in such a modular multilevel voltage source converter.

BACKGROUND

Modular multilevel voltage source converters are often used for converting between alternating current (ac) and direct current (dc), such as between three-phase ac and dc and vice-versa. A converter may as an example be provided in a converter station and be made up of a number of phase legs, one for each phase, where each phase leg comprises at least two phase arms, an upper and a lower phase arm. The converter is not limited to being used in a converter station but may for instance also be used in a motor drive.

Each phase arm is then equipped with a number of cells, such as half-bridge or full bridge cells, where a cell has an energy storage element, often in the form of a capacitor, that is used for providing a voltage used for contributing to the forming of a waveshape.

One aspect that may be of interest to handle in such a voltage source converter are circulating currents between the phase legs. In some instances it is of interest to inject circulating currents, while in others it may be of interest to reduce the circulating currents.

One document that discusses injecting of circulating currents is WO 2014/111595.

Removing or reducing circulating currents may especially be of interest with regard to $2^{nd}$ harmonics of the fundamental frequency of the converter.

One way of removing circulating current is through the introduction of a filter in the converter. This is for instance described in US2011/0261598.

Another way to reduce the circulating current is through employing the converter control based on current measurements of the circulating current.

When handling a circulating current, which may be the reduction or injection of it, it would be of interest to handle the circulating current with a sufficient accuracy only using the standard converter control measurements, i.e. only using measurements that are used for waveshape forming and other conventional types of control. It would thus be of interest to obtain a circulating current handling without requiring special measurements such as circulating current measurements.

The present invention is directed towards such improved circulating current handling.

SUMMARY OF THE INVENTION

The present invention is directed to the problem of fast handling of circulating currents in a modular multilevel voltage source converter with a sufficient accuracy.

This object is according to a first aspect of the present invention achieved through a modular multilevel voltage source converter comprising:

a number of phase legs, each comprising an upper and a lower phase arm comprising cells with energy storage elements, and a control unit operative to determine a circulating current control signal contribution for a phase leg based on the sum of cell voltages in the upper phase arm of the phase leg, the sum of cell voltages in the lower phase arm of the phase leg and at least one modulation reference ($m_R$, $m_{cm}$) and combine the circulating control signal contribution with a modulation reference used for one of the phase arms in order to obtain a modified voltage reference for controlling the phase arm to handle a circulating current while a waveshape is formed.

The object is according to a second aspect achieved through a method of handling circulating currents in a modular multilevel voltage source converter comprising a number of phase legs, each comprising an upper and a lower phase arm comprising cells with energy storage elements, the method being performed in a control unit of the voltage source converter and comprising:

determining a circulating current control signal contribution for a phase leg based on the sum of cell voltages in the upper phase arm of the phase leg, the sum of cell voltages in the lower phase arm of the phase leg and at least one modulation reference, and combining the circulating control signal contribution with a modulation reference used for one of the phase arms in order to obtain a modified voltage reference for controlling the phase arm to handle a circulating current while a waveshape is formed.

The object is according to a third aspect of the present invention achieved through a computer program product handling circulating currents in a modular multilevel voltage source converter comprising a number of phase legs, each comprising an upper and a lower phase arm comprising cells with energy storage elements, the computer program product comprising a data carrier with computer program code configured to cause a control unit of the voltage source converter to determining a circulating current control signal contribution for a phase leg based on the sum of cell voltages in the upper phase arm of the phase leg, the sum of cell voltages in the lower phase arm of the phase leg and at least one modulation reference, and combining the circulating control signal contribution with a modulation reference used for one of the arms in order to obtain a modified voltage reference for controlling the phase arm to handle a circulating current while a waveshape is formed.

The at least one modulation reference may comprise a waveforming modulation reference as well as a common mode modulation reference.

The control performed by the control unit may furthermore comprise obtaining measurements of the cell voltages in the upper and lower phase arms and determining the sums using these cell voltage measurements.

The present invention has a number of advantages. It provides an improved circulating current control. Furthermore, standard voltage and current measurements are sufficient to implement the proposed controller. No special measurements are needed for the implementation of the circulating current control. The control is also easy to implement through addition of control software.

BRIEF DESCRIPTION OF THE DRAWINGS

The present invention will in the following be described with reference being made to the accompanying drawings, where FIG. 1 schematically shows a modular multilevel voltage source converter, FIG. 2 schematically shows a first type of cell used in the converter, FIG. 3 schematically shows a second type of cell used in the converter, FIG. 4 schematically shows a control unit for controlling the converter.

DETAILED DESCRIPTION OF THE INVENTION

In the following, a detailed description of preferred embodiments of the invention will be given.

Figure 1:
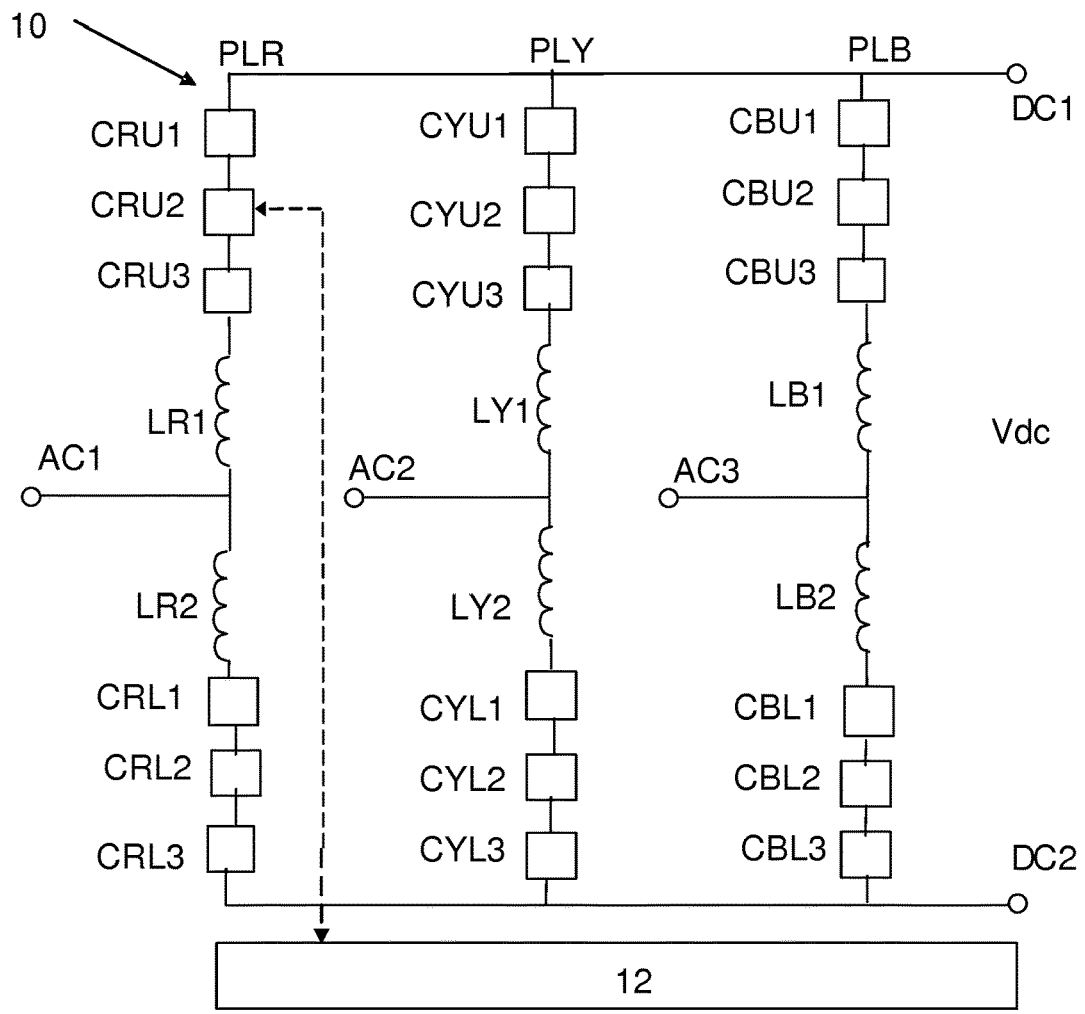

FIG. 1 schematically shows one way of realizing a modular multilevel voltage source converter 10. The converter 10 is a three-phase voltage source converter for converting between alternating current (ac) and direct current (dc) and the converter 10 has a dc side and an ac side, where the ac side may face and be connected to an ac power network and the dc side may face and be connected to a dc power network, which networks may both be transmission networks.

The converter 10 comprises a number of phase legs, and in this case three phase legs PLR, PLY and PLB, for instance connected in parallel between a first and a second dc terminal DC1 and DC2, where the first dc terminal DC1 may be connected to a first pole of the dc power network and the second dc terminal DC2 may be connected to a second pole of the dc power network or to ground. The mid points of the phase legs may furthermore be connected to corresponding AC terminals AC1, AC2, AC3.

The first dc pole furthermore has a potential $V_{dc}$ that may be positive. The first pole may therefore also be termed a positive pole. A phase arm between the first dc terminal DC1 and a first, second or third ac terminal AC1, AC2 and AC3 may be termed an upper phase arm, while a phase arm between the first, second or third ac terminal AC1, AC2 and AC3 and the second dc terminal DC2 may be termed a lower phase arm. Each phase leg is furthermore divided into at least one upper and at least one lower phase arm. In the example of FIG. 1 there is only one upper phase arm and one lower phase arm in each phase leg.

Moreover, the upper phase arms are each joined to the corresponding AC terminal AC1, AC2 and AC3 via a corresponding first or upper arm reactor LR1, LY1 and LB1, while the lower phase arms are each joined to the same AC terminal AC1, AC2 and AC3 via a corresponding second or lower arm reactor LR2, LY2 and LB2.

As mentioned earlier, the voltage source converter 10 is a modular multilevel converter (MMC) where each phase arm comprises a number of series-connected cells, where a cell may be a half-bridge cell or a full-bridge cell comprising an energy storage element. In FIG. 1 each phase arm comprises three cells. The upper phase arm of the first phase leg PLR thereby comprises three cells CRU1, CRU2 and CRU3, while the lower phase arm of the first phase leg PLR comprises three cells CRL1, CRL2 and CRL3. The upper phase arm of the second phase leg PLY comprises three cells CYU1, CYU2 and CYU3, while the lower phase arm of the second phase leg PLY comprises three cells CYL1, CYL2 and CYL3. Finally the upper phase arm of the third phase leg PLB comprises three cells CBU1, CBU2 and CBU3, while the lower phase arm of the third phase leg PLB comprises three cells CBL1, CBL2 and CBL3. The number of cells shown is only an example. It should therefore be realized that there may be more or even fewer cells in the phase arms.

There is finally a control unit 12, which controls the operation of the converter 10 and more particularly controls each phase arm of each phase leg. The control unit 12 is provided for controlling all the phase arms of the converter 10. It thus controls all the cells of all phase arms. However, in order to simplify the figure only the control of one cell CRU2 of the upper phase arm of the first phase leg PLR is indicated. The control is indicated through a bidirectional dashed arrow in order to show that not only is a control signal applied to the cell, but also that measurements are made in the cell, where these measurements are cell voltage measurements. The control unit 12 may be implemented through a computer or a processor with associated program memory. One purpose of the control unit 12 is to control the converter cells to generate ac waveforms and another is to handle circulating currents.

As mentioned above a cell may be a half bridge cell or a full bridge cell. In both cases a cell comprises at least one string of series connected switching units in parallel with an energy storage element. A switching unit may be realized in the form a transistor with anti-parallel diode. However, it is also known to be realized using other types of semiconducting units. An energy storage element may as an example be realized as a capacitor or a battery.

The above described dc network may be a High Voltage Direct Current (HVDC) network and therefore the converter 10 may be an HVDC converter, where a high voltage may be a voltage above 100 kV.

Figure 2:
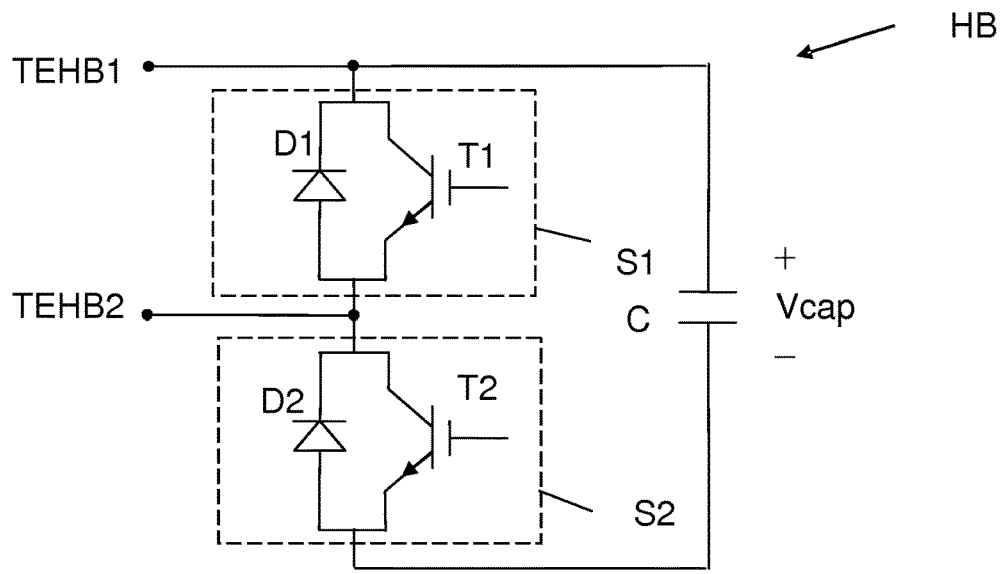
Figure 3:
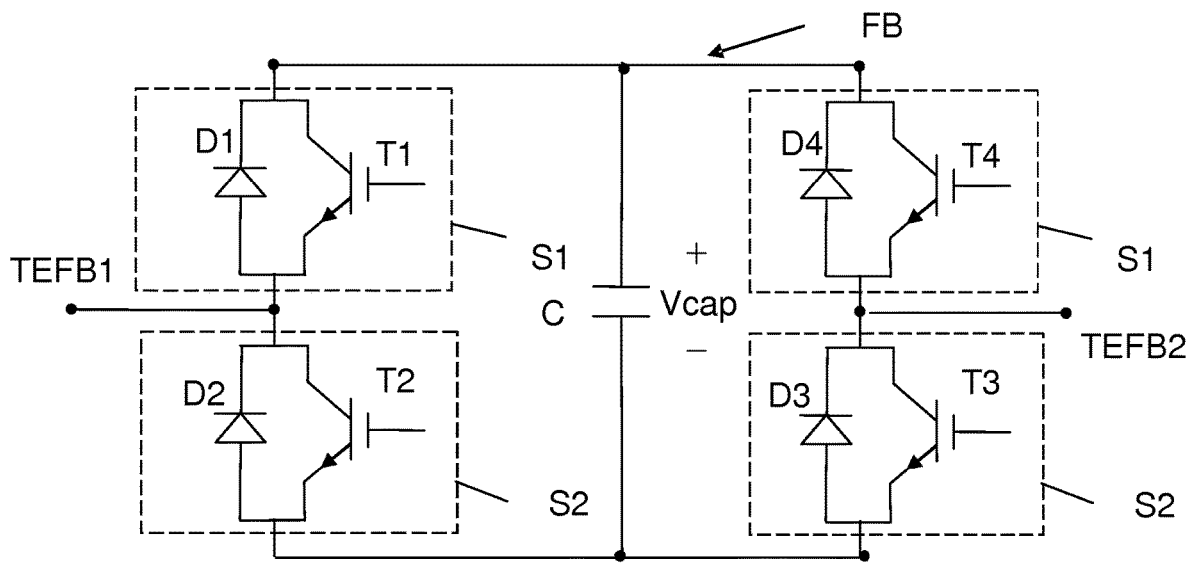

FIG. 2 schematically shows an example of a half bridge cell, while FIG. 3 schematically shows an example of a full bridge cell.

As can be seen in FIG. 2, the half bridge cell HB comprises an energy storage element, here in the form of a capacitor C, which is connected in parallel with a first group of switching units S1 and S2. The energy storage element C provides a voltage Vcap, which is a cell voltage. The energy storage element C therefore has a positive and negative end, where the positive end has a higher potential than the negative end. The switching units S1 and S2 in the first group are connected in series with each other in a first branch, which first branch is connected in parallel with the energy storage element C, where each switching unit may be realized using a first type of semiconducting element that is a unidirectional conduction element, such as a diode, and a second type of semiconducting element in the form of a switching element, such as a transistor like an IGBT (Insulated Gate Bipolar Transistor) or an IGCT (Integrated Gate Commutated Thyristor). However, also other types of semiconductor switching elements are contemplated, such as Bi-mode Insulated Gate Transistors (BiGTs). The diode may be anti-parallel to the transistor. In FIG. 2 the first switching unit S1 has a first transistor T1 with a first anti-parallel diode D1. The first diode D1 is connected between the emitter and collector of the transistor T1 and has a direction of conductivity from the emitter to the collector as well as towards the positive end of the energy storage element C. The second switching unit S2 has a second transistor T2 with a second anti-parallel diode D2. The second diode D2 is connected in the same way in relation to the energy storage element C as the first diode D1, i.e. conducts current towards the positive end of the energy storage element C. The first switching unit S1 is furthermore connected to the positive end of the energy storage element C, while the second switching unit S2 is connected to the negative end of the energy storage element C.

There is also a first cell connection terminal TEHB1 and a second cell connection terminal TEHB2, each providing a connection for the cell to a phase arm of a phase leg of the voltage source converter. In this example of half bridge cell the first cell connection terminal TEHB1 provides a connection to the junction between the first switching unit S1 and the capacitor C, while the second cell connection terminal TEHB2 provides a connection to the junction between the first and the second switching units S1 and S2. These cell connection terminals TEHB1 and TEHB2 thus provide points where the cell can be connected to a phase arm.

It should be realized that FIG. 2 shows a first type of half bridge cell. A second type of half bridge cell has the first cell connection terminal connected to the junction between the second switching unit S2 and the capacitor C instead.

As can be seen in FIG. 3 a full bridge cell is based on the same structure as the half bridge cell. There is thus a first branch and an energy storage element. In this type of cell there is also a second branch of switching units in parallel with the first branch of switching units as well as the energy storage element C. The switching units of the second branch are typically realized in the same way as the switching units of the first branch i.e. using a first type of semiconducting element that is a unidirectional conduction element, such as a diode, and a second type of semiconducting element in the form of a switching element, such as a transistor like an IGBT or BiGt or an IGCT. In FIG. 3 a third switching unit S3 of the second branch has a third transistor T3 with a third anti-parallel diode D3 and a fourth switching unit S4 of the second branch has a fourth transistor T4 with a fourth anti-parallel diode D4. The fourth switching unit S4 is furthermore connected to the positive end of the energy storage element C, while the third switching unit S3 is connected to the negative end of the energy storage element C.

There is also a first and second cell connection terminal TEFB1 and TEFB2.

The first cell connection terminal TEFB1 in this full-bridge cell provides a connection to the junction between the first and the second switching units S1 and S2, while the second cell connection terminal TEFB2 provides a connection to the junction between the third and the fourth switching units S3 and S4.

Figure 4:
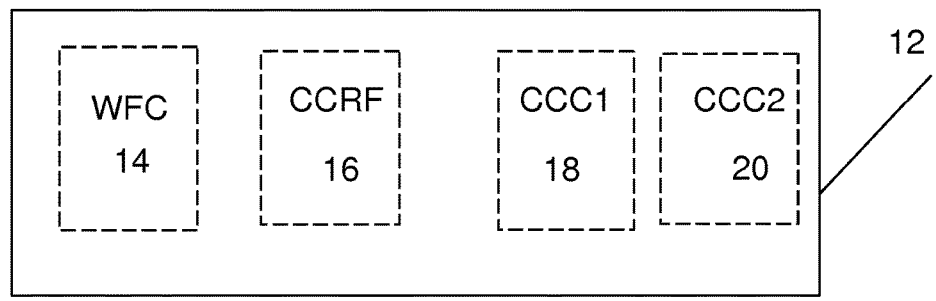

FIG. 4 shows a block schematic of one way of realizing the control unit 10. The control unit 10 comprises a waveforming control module WFC 14, a circulating current representation forming module CCRF 16, a first circulating current control module CCC1 18 and a second circulating current control module CCC2 20.

Aspects of the invention are directed towards reducing or even eliminating currents that are circulating between the phase legs of the converter. At least some of this circulating current reduction, which is carried out by the first circulating current control module 18, employs a feed forward control signal contribution to achieve this. The feed forward control is fast and simple to implement and is easily combined with the forming of waveshapes. However, in case the feed forward control signal contribution does not properly reflect the circulating current of a phase leg, then this control is not as efficient as it could be.

Aspects of the invention are directed towards modelling the circulating current of the phase leg so that an improved feed forward control accuracy can be obtained.

Figure 5:
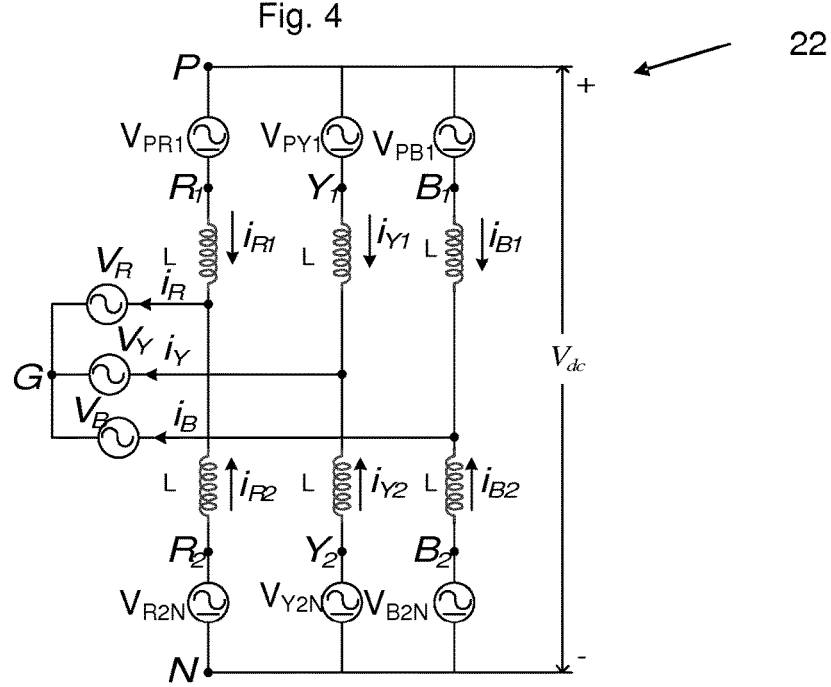
FIG. 5 shows a model of the converter used for obtaining a circulating current representation, FIG. 6 schematically shows a waveforming control module of the control unit, FIG. 7 schematically shows a high pass filter of a first circulating current control module of the control unit, FIG. 8 schematically shows a circulating current control structure of the first circulating current control module, FIG. 9 schematically shows a second circulating current control module of the control unit, FIG. 10 schematically shows a first control signal contribution provided by the circulating current control structure of the first circulating current control module combined with a second control signal contribution from the second circulating current control module.

In order to obtain a representation of the circulating current that can be used for such a feed forward control signal contribution, a model of the converter 10 may be used. FIG. 5 schematically shows one such model 22. The phase legs that are provided between a first dc potential P and a second lower dc potential N, are in this case represented by voltage sources in series with inductances, which correspond to the inductances of the above-mentioned arm reactors. The first dc potential P may be a pole voltage and the second dc potential N may be ground or a second pole voltage. Moreover, the upper phase arm of the first phase leg is represented by an arm voltage source $V_{PR1}$ connected between the first dc potential P and an upper phase arm inductance L, where the junction between the arm voltage source $V_{PR1}$ and inductance L is denoted $R_1$ and the arm current through the inductance L away from the arm voltage source $V_{PR1}$ is denoted $i_{R1}$. In a similar manner the lower phase arm of the first phase leg is represented by an arm voltage source $V_{R2N}$ connected between the second dc potential N and a lower phase arm inductance L, where the junction between the arm voltage source $V_{R2N}$ and inductance L is denoted $R_2$ and the arm current through this inductance L away from the arm voltage source $V_{R2N}$ is denoted $i_{R2}$. The upper phase arm of the second phase leg is represented by an arm voltage source $V_{PY1}$ connected between the first dc potential P and an upper phase arm inductance L, where the junction between the arm voltage source $V_{PY1}$ and inductance L is denoted $Y_1$ and the arm current through the inductance L away from the arm voltage source $V_{PY1}$ is denoted $i_{Y1}$. The lower phase arm of the second phase leg is represented by an arm voltage source $V_{Y2N}$ connected between the second dc potential N and a lower phase arm inductance L, where the junction between the arm voltage source $V_{Y2N}$ and inductance L is denoted $Y_2$ and the arm current through this inductance L away from the arm voltage source $V_{Y2N}$ is denoted $i_{Y2}$. The upper phase arm of the third phase leg is represented by an arm voltage source $V_{PB1}$ connected between the first dc potential P and an upper phase arm inductance L, where the junction between the arm voltage source $V_{PB1}$ and inductance L is denoted $B_1$ and the arm current through the inductance L away from the arm voltage source $V_{PB1}$ is denoted $i_{B1}$. In a similar manner the lower phase arm of the third phase leg is represented by an arm voltage source $V_{B2N}$ connected between the second dc potential N and a lower phase arm inductance L, where the junction between the arm voltage source $V_{B2N}$ and inductance L is denoted $B_2$ and the arm current through this inductance L away from the arm voltage source $V_{B2N}$ is denoted $i_{B2}$. Furthermore, in a phase leg the inductances of the upper and lower phase arms are connected to each other. The phase arm inductances here have the same notation because they all have the same values.

The arm voltage sources $V_{PR1}$, $V_{PY1}$, $V_{PB1}$, $V_{R2N}$, $V_{Y2N}$ and $V_{B2N}$ all provide arm voltages having an ac as well as a dc voltage contribution.

The mid points of the phase legs, i.e. the junctions where inductances of the upper and lower phase arms are connected to each other, all connect to a neutral point G of a star connection via a corresponding ac voltage source. The midpoint of the first phase leg thereby has a first ac connection to the neutral point G comprising an ac voltage source $V_R$ and the current in this first ac connection in the direction towards the neutral point G is termed $i_R$. The midpoint of the second phase leg has a second ac connection to the neutral point G comprising an ac voltage source $V_Y$ and the current in this second ac connection in the direction towards the neutral point G is termed $i_Y$. The midpoint of the third phase leg has a third ac connection to the neutral point G comprising an ac voltage source $V_B$ and the current in this third ac connection in the direction towards the neutral point G is termed $i_B$.

Now will follow a description of how representations of the circulating currents in the different phase legs may be obtained based on the model shown in FIG. 5.

The arm currents of a modular multilevel converter (MMC) being modelled according to FIG. 5 can be derived using the equations (1) to (7) below. In this derivation, it is assumed that the grid voltages are balanced; the effective grid impedance is neglected, where the grid may be an ac power network connected to the ac side of the converter 10.

$$Ri_{R1} + L\frac{di_{R1}}{dt} = -V_R + \left[\frac{2}{3}V_{PR1} - \frac{1}{3}V_{PY1} - \frac{1}{3}V_{PB1}\right] + V_E \quad (1)$$

$$Ri_{Y1} + L\frac{di_{Y1}}{dt} = -V_Y + \left[-\frac{1}{3}V_{PR1} + \frac{2}{3}V_{PY1} - \frac{1}{3}V_{PB1}\right] + V_E \quad (2)$$

$$Ri_{B1} + L\frac{di_{B1}}{dt} = -V_B + \left[-\frac{1}{3}V_{PR1} - \frac{1}{3}V_{PY1} + \frac{2}{3}V_{PB1}\right] + V_E \quad (3)$$

$$Ri_{R2} + L\frac{di_{R2}}{dt} = -V_R + \left[\frac{2}{3}V_{R2N} - \frac{1}{3}V_{Y2N} - \frac{1}{3}V_{B2N}\right] - V_E \quad (4)$$

$$Ri_{Y2} + L\frac{di_{Y2}}{dt} = -V_Y + \left[-\frac{1}{3}V_{R2N} + \frac{2}{3}V_{Y2N} - \frac{1}{3}V_{B2N}\right] - V_E \quad (5)$$

$$Ri_{B2} + L\frac{di_{B2}}{dt} = -V_B + \left[-\frac{1}{3}V_{R2N} - \frac{1}{3}V_{Y2N} + \frac{2}{3}V_{B2N}\right] - V_E \quad (6)$$

$$V_E = \frac{V_{dc}}{2} + \frac{1}{6}[V_{PR1} + V_{PY1} + V_{PB1}] - \frac{1}{6}[V_{R2N} + V_{Y2N} + V_{B2N}] \quad (7)$$

It is to be noted that $V_E$ is a common mode voltage, and is a function of all the six arm voltages. Hence, an arm current is influenced by all six arm voltages in the converter 10.

The voltages $V_{PR1}$, $V_{R2N}$ etc. can be expanded as follows, assuming that half-bridge cells are present in the converter:

$$V_{PR1} = (m_R + m_{cm} - 1)\frac{V_{dc}}{2}; \quad V_{PY1} = (m_Y + m_{cm} - 1)\frac{V_{dc}}{2}; \quad (8)$$

$$V_{PB1} = (m_B + m_{cm} - 1)\frac{V_{dc}}{2}$$

$$V_{R2N} = (m_R + m_{cm} + 1)\frac{V_{dc}}{2}; \quad V_{Y2N} = (m_Y + m_{cm} + 1)\frac{V_{dc}}{2}; \quad (9)$$

$$V_{B2N} = (m_B + m_{cm} + 1)\frac{V_{dc}}{2}$$

Here, $m_R$, $m_Y$ and $m_B$ are the three-phase sinusoidal modulating signals used for forming an ac waveshape on a corresponding ac terminal. Hence, ($m_R+m_Y+m_B=0$). $m_{cm}$ represents the common-mode signal that is generally added to improve the dc link utilization. $m_{cm}$ may be determined in a number of different ways depending on the type of modulation being employed. One way of determining $m_{cm}$ is through:

$$m_{cm} = -\frac{\max(m_R, m_Y, m_B) + \min(m_R, m_Y, m_B)}{2} \quad (10)$$

However, $V_{PR1}$, $V_{PY1}$ etc., should be expressed in a strict sense as follows:

$$V_{PR1} = \frac{(m_R + m_{cm} - 1)}{2}\sum V_{cap-PR1}; \quad (11)$$

$$V_{PY1} = \frac{(m_Y + m_{cm} - 1)}{2}\sum V_{cap-PY1};$$

$$V_{PB1} = \frac{(m_B + m_{cm} - 1)}{2}\sum V_{cap-PB1}$$

$$V_{R2N} = \frac{(m_R + m_{cm} + 1)}{2}\sum V_{cap-R2N}; \quad (12)$$

$$V_{Y2N} = \frac{(m_Y + m_{cm} + 1)}{2}\sum V_{cap-Y2N};$$

$$V_{B2N} = \frac{(m_B + m_{cm} + 1)}{2}\sum V_{cap-B2N}$$

where $\Sigma V_{cap-PR1}$ is the sum of all the cell capacitor voltages in the upper arm of the R-phase. Similar definitions holds good for other phases also. Ideally, the sum of cell voltages in each arm of FIG. 5 should be equal to $V_{dc}$. However, due to ripple in cell capacitor voltages, this sum deviates from the nominal dc voltage at any given instant. Hence the variation in sum of cell capacitor voltages in an arm, from its nominal value can be expressed as follows:

$$\Delta V_{PR1}=(V_{dc,nom}-\Sigma V_{cap-PR1}); \quad \Delta V_{PY1}=(V_{dc,nom}-\Sigma V_{cap-PY1});$$

$$\Delta V_{PB1}=(V_{dc,nom}-\Sigma V_{cap-PB1}) \quad (13)$$

$$\Delta V_{R2N}=(V_{dc,nom}-\Sigma V_{cap-R2N}); \quad \Delta V_{Y2N}=(V_{dc,nom}-\Sigma V_{cap-Y2N});$$

$$\Delta V_{B2N}=(V_{dc,nom}-\Sigma V_{cap-B2N}) \quad (14)$$

Substituting (11) to (14) into (1) to (7), the arm currents can be redefined as follows.

$$Ri_{R1} + L\frac{di_{R1}}{dt} = -V_R + m_R\frac{V_{dc}}{2} + E_{R1} + V_{CM} \quad (15)$$

$$Ri_{Y1} + L\frac{di_{Y1}}{dt} = -V_Y + m_Y\frac{V_{dc}}{2} + E_{Y1} + V_{CM} \quad (16)$$

$$Ri_{B1} + L\frac{di_{B1}}{dt} = -V_R + m_B\frac{V_{dc}}{2} + E_{B1} + V_{CM} \quad (17)$$

-continued $$Ri_{R2} + L\frac{di_{R2}}{dt} = -V_R + m_R\frac{V_{dc}}{2} + E_{R2} - V_{CM} \quad (18)$$

$$Ri_{Y2} + L\frac{di_{Y2}}{dt} = -V_Y + m_Y\frac{V_{dc}}{2} + E_{Y2} - V_{CM} \quad (19)$$

$$Ri_{B2} + L\frac{di_{B2}}{dt} = -V_R + m_B\frac{V_{dc}}{2} + E_{B2} - V_{CM} \quad (20)$$

The terms $E_{R1}$, $E_{R2}$ and $V_{CM}$ are defined in equations (21) to (23). Other terms $E_{Y1}$, $E_{Y2}$, $E_{B1}$ and $E_{B2}$ can also be defined in a similar fashion.

$$E_{R1} = \frac{(m_{cm}-1)}{3}\left[-\Delta V_{PR1} + \frac{\Delta V_{PY1}}{2} + \frac{\Delta V_{PB1}}{2}\right] - \quad (21)$$
$$\frac{1}{3}(m_R\Delta V_{PR1}) + \frac{1}{6}(m_Y\Delta V_{PY1}) + \frac{1}{6}(m_B\Delta V_{PB1})$$

$$E_{R2} = \frac{(m_{cm}-1)}{3}\left[-\Delta V_{R2N} + \frac{\Delta V_{Y2N}}{2} + \frac{\Delta V_{B2N}}{2}\right] - \quad (22)$$
$$\frac{1}{3}(m_R\Delta V_{R2N}) + \frac{1}{6}(m_Y\Delta V_{Y2N}) + \frac{1}{6}(m_B\Delta V_{B2N})$$

$$V_{CM} = -\frac{m_R}{12}(\Delta V_{PR1} - \Delta V_{R2N}) - \frac{m_Y}{12}(\Delta V_{PY1} - \Delta V_{Y2N}) - \quad (23)$$
$$\frac{m_B}{12}(\Delta V_{PB1} - \Delta V_{B2N}) - \frac{m_{cm}}{12}(\Delta V_{PR1} - \Delta V_{R2N}) -$$
$$\frac{m_{cm}}{12}(\Delta V_{PY1} - \Delta V_{Y2N}) - \frac{m_{cm}}{12}(\Delta V_{PB1} - \Delta V_{B2N}) +$$
$$\frac{1}{12}(\Delta V_{PR1} + \Delta V_{R2N}) + \frac{1}{12}(\Delta V_{PY1} + \Delta V_{Y2N}) + \frac{1}{12}(\Delta V_{PB1} + \Delta V_{B2N})$$

Equation (15) can be derived into three parts as follows:

$$Ri_{R1a} + L\frac{di_{R1a}}{dt} = -V_R + m_R\frac{V_{dc}}{2} \quad (24)$$

$$Ri_{R1b} + L\frac{di_{R1b}}{dt} = E_{R1} \quad (25)$$

$$Ri_{R1c} + L\frac{di_{R1c}}{dt} = V_{CM} \quad (26)$$

$$i_{R1} = (i_{R1a} + i_{R1b} + i_{R1c}) \quad (27)$$

Equation (24) corresponds to the fundamental component of arm current $i_{R1}$; this component enters the grid. Equation (25) corresponds to the circulating current between the upper and lower arms of R-phase.
Equation (26) represents the common-mode current that flows through all (all three-phase) upper and lower arms. Part of this current represents the dc current through the arm.

Ideally, the arm current (for example $i_{R1}$) should contain only the fundamental and the dc components. Currents at all other frequencies are to be absent. The dominant component of arm current other than fundamental and dc is the $2^{nd}$ harmonic component, which also circulates through the upper as well as lower arms. The circulating current in R-phase is defined as $$i_{cir} = (i_{R1} - I_{R2}) \quad (28)$$

From (15) and (18), the circulating current in R-phase can be expressed as:

$$Ri_{cir} + L\frac{di_{cir}}{dt} = E_{R1} - E_{R2} + 2V_{CM} \quad (29)$$

-continued $$E_{R1} - E_{R2} + 2V_{CM} = \quad (30)$$
$$-\frac{(m_{cm}+m_R)}{2}(\Delta V_{PR1} - \Delta V_{R2N}) + \frac{1}{2}(\Delta V_{PR1} + \Delta V_{R2N})$$

One observation that may be made is that there is a first expression $\Delta V_{PR1}$, which, as can be seen in equation (13) comprises the sum of cell voltages in the upper phase arm $\Sigma V_{cap\text{-}PR1}$. There is also a second expression $\Delta V_{R2N}$, which, as can be seen in equation (14) comprises the sum of cell voltages in the lower phase arm $\Sigma V_{cap\text{-}R2N}$. For this reason it is also possible to express equation (30) as $$E_{R1} - E_{R2} + 2V_{CM} = -\frac{(m_{cm}+m_R)}{2}\left(\sum V_{cap\text{-}R2N} - \sum V_{cap\text{-}PR1}\right) + \quad (31)$$
$$\frac{1}{2}\left(2V_{dc,nom} - \sum V_{cap\text{-}PR1} - \sum V_{cap\text{-}R2N}\right)$$

It can also be seen that in equation (31) the first expression is $\Sigma V_{cap\text{-}PR1}$ and the second expression is $\Sigma V_{cap\text{-}R2N}$. It can also be observed that in both equations there is a first term $$\frac{(m_{cm}+m_R)}{2}$$

that is based on modulation signals, a second term ($\Delta V_{PR1} - \Delta V_{R2N}$) or ($\Sigma V_{cap\text{-}R2N} - \Sigma V_{cap\text{-}PR1}$) that comprises a difference between the first and second expressions and a third term that comprises a sum of the first and second expressions $$\frac{1}{2}(\Delta V_{PR1} + \Delta V_{R2N}) \text{ or } \frac{1}{2}\left(2V_{dc,nom} - \sum V_{cap\text{-}PR1} - \sum V_{cap\text{-}R2N}\right).$$

It can thus be observed that the circulating current of a phase leg has a dependency on the sum of cell voltages in the upper phase arm $\Sigma V_{cap\text{-}PR1}$ of the phase leg, the sum of cell voltages in the lower phase arm $\Sigma V_{cap\text{-}R2N}$ of the phase leg and at least one modulation reference $m_R$, $m_{cm}$, comprising the modulation reference of the phase leg.

When studying the first term it can be seen that it has a dependence of the fundamental frequency of the converter. Also the second term has a dependence of the fundamental frequency of the converter. It thus has a $2^{nd}$ harmonic component. The third term has a $2^{nd}$ harmonic component as well as a dc component. Furthermore the multiplication of the first and second terms will also lead to the product having a $2^{nd}$ harmonic and a dc component. This also means that equations (30) and (31) will define a circulating current having a $2^{nd}$ harmonic and a dc component.

Circulating currents for the second and third phase legs having the same types of properties can in a similar manner be defined through:

$$E_{Y1} - E_{Y2} + 2V_{CM} = \quad (32)$$
$$-\frac{(m_{cm}+m_Y)}{2}(\Delta V_{PY1} - \Delta V_{Y2N}) + \frac{1}{2}(\Delta V_{PY1} + \Delta V_{Y2N})$$

$$E_{B1} - E_{B2} + 2V_{CM} = \quad (33)$$
$$-\frac{(m_{cm}+m_B)}{2}(\Delta V_{PB1} - \Delta V_{B2N}) + \frac{1}{2}(\Delta V_{PB1} + \Delta V_{B2N})$$

which equations may be rewritten as:

$$E_{Y1} - E_{Y2} + 2V_{CM} = -\frac{(m_{cm} + m_Y)}{2}(\sum V_{cap-Y2N} - \sum V_{cap-PY1}) + \frac{1}{2}(2V_{dc,nom} - \sum V_{cap-PY1} - \sum V_{cap-Y2N}) \quad (34)$$

$$E_{B1} - E_{B2} + 2V_{CM} = -\frac{(m_{cm} + m_B)}{2}(\sum V_{cap-B2N} - \sum V_{cap-BR1}) + \frac{1}{2}(2V_{dc,nom} - \sum V_{cap-BR1} - \sum V_{cap-B2N}) \quad (35)$$

Another observation that may be made here is that the modelled circulating current is based on a difference between a nominal dc voltage of at least one of the phase arms and both the sums of cell voltages, where in this case the nominal dc voltage is the nominal dc voltage $V_{dc,nom}$ of the phase leg.

Equations (30)-(35) thereby provide representations of the circulating currents in the different phase legs, which representations are faithful reproductions of the $2^{nd}$ harmonics of the circulating currents. As the circulating current representations are made up of a first and second expression that depend on the number of capacitors in the different phase arms, the modulation used and the nominal dc voltage, they do not require any other quantity than the cell voltages. Thereby they are suitable for use in feed forward control of the circulating currents.

One way in which the representations can be used will now be described with reference also being made to FIGS. 6, 7 and 8.

Figure 6:
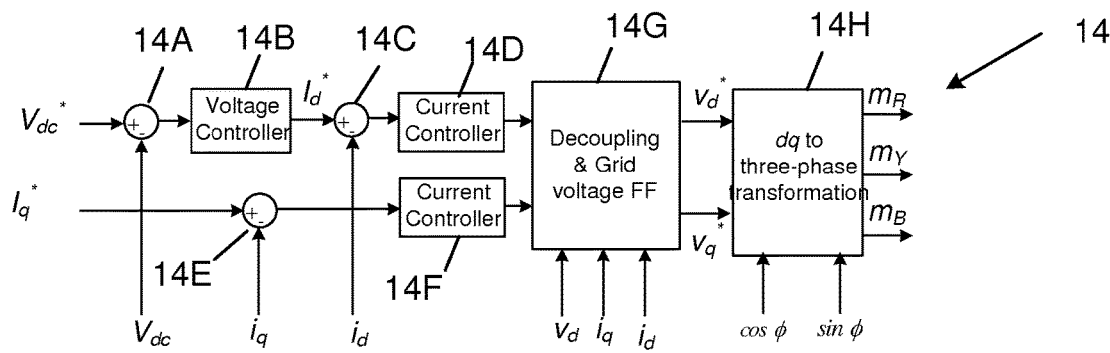
Figure 7:
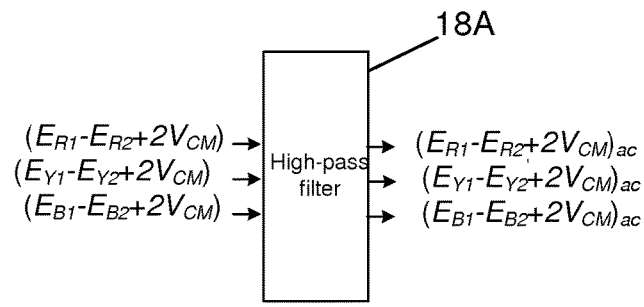
Figure 8:
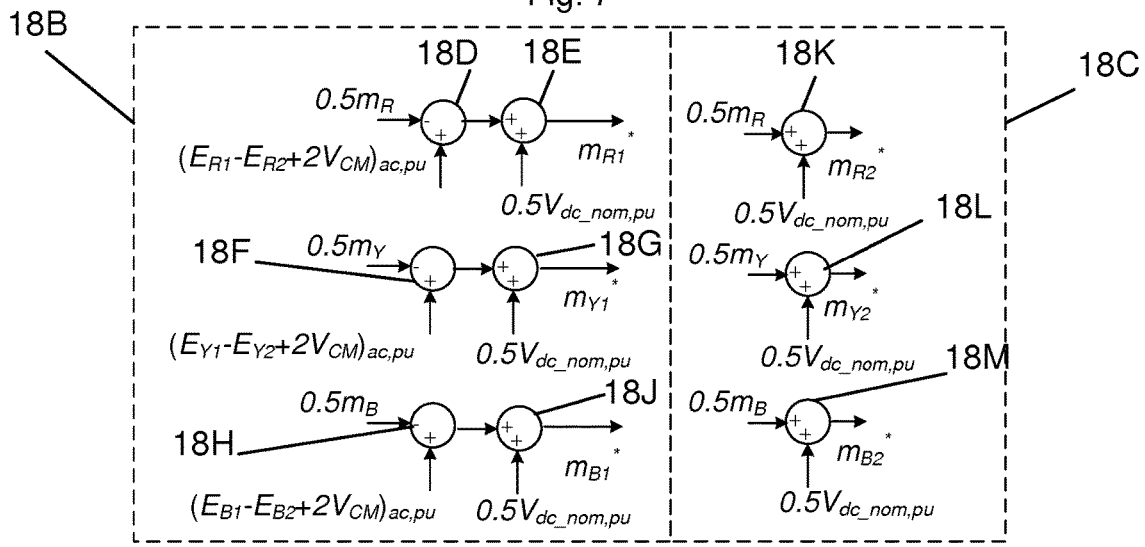

FIG. 6 shows a block schematic of the waveforming control module 14, FIG. 7 schematically shows a high pass filter 18A of the first circulating current control module 18 and FIG. 8 schematically shows blocks of a circulating current control structure of the first circulating current control module. The filter 18A in FIG. 7 and the blocks in FIG. 8 thereby make up the first circulating current control module 18.

The circulating current representations expressed in equations 30-35 are determined by the circulating current representation forming module 16 of the control unit 12. It may more particularly determine a circulating current control signal contribution ($E_{R1}-E_{R2}+2V_{CM}$) for a phase leg based on the sum of cell voltages in the upper phase arm of the phase leg, the sum of cell voltages in the lower phase arm of the phase leg and at least one modulation reference.

With regard to the first phase leg, the circulating current representation forming module 16 may obtain the representations through obtaining all the cell voltage measurements $V_{cap}$ in the upper phase arm of the phase leg and form the first expression based on these cell voltage measurements, i.e. through summing the cell voltage measurements for obtaining the sum $\Sigma V_{cap-PR1}$. It may also obtain all the cell voltage measurements $V_{cap}$ in the lower phase arm of the phase leg and form the second expressions based on these cell voltage measurements, i.e. through summing for obtaining $\Sigma V_{cap-R2N}$. The modulation index $m_R$ as well as possibly also the index $m_{cm}$ may be obtained from the waveforming control module 14 and the nominal dc voltage $V_{dc\_nom}$ may be known. Thereafter the circulating current representation forming module 16 forms the first, second and third terms using the first and second expressions the modulation indexes and the nominal dc voltage, which is followed by forming the circulating current representation of the first phase leg using the first, second and third terms. In a similar manner the circulating current representations are formed for the second and third phase legs. It can here be seen that as an alternative to obtaining the common mode modulation reference $m_{cm}$ from the waveforming control module 14, the circulating current representation forming module 16 may itself determine it based on $m_R$, $m_Y$ and $m_B$.

The circulating current representations formed by the circulating current representation forming module 16 of the control unit 12 thereby models the circulating current in each phase leg. These representations are then used by the first circulating current control module 18.

The waveforming control module 14, which is a conventional waveforming control module comprises a first subtracting block 14A where a desired dc voltage $V_{dc}^*$ is received on a positive terminal and a measured dc voltage $V_{dc}$ is received on a negative terminal. The first subtracting block 14A determines the difference between these voltages and supplies it as a difference signal to a first voltage controller block 14B, which performs processing in the form of proportional and possibly also integrating control on the difference signal and delivers the processed difference signal as a desired d plane current $I_d^*$ to a positive terminal of a second subtracting block 14C. A negative terminal of the second subtracting block 14C receives a measured d plane current id. The second subtracting block 14C then determines the difference between the desired and measured d plane currents $I_d^*$ and $i_d$ and delivers the difference as a difference signal to a first current controller 14D, in which processing in the form of proportional and possibly also integrating control is performed. In a similar manner a desired q plane current $I_q^*$ is received at a positive terminal of a third subtracting block 14E, which has a negative terminal on which a measured q plane current $i_q$ is received. The third subtracting block 14E determines the difference between the desired and received q plane currents $I_q^*$ and $i_q$ and supplies the difference as a difference signal to a second current controller 14F, in which processing in the form of proportional and possibly also integrating control is performed. The two processed d and q plane current difference signals are then forwarded from the first and second current controllers 14D and 14F to a decoupling and grid voltage feed forward block 14G, which also receives a measured d plane voltage $v_d$ and measured q and d plane currents $i_q$ and $i_d$ and thereafter generates a desired ac d plane voltage $v_d^*$ and a desired ac q plane voltage $v_q^*$ for instance using pulse width modulation (PWM). These voltages are then supplied to a transforming block 14H that transforms the d and q voltages to modulation signals $m_R$, $m_Y$ and $m_B$ in the abc plane using cos φ and sin φ, where the modulation signals are to be used as control signals in the three phase legs. These modulation signals represent the waveshapes that are to be produced by the three phase legs. The angle φ depends on which frequency component that is transformed. In case the component is the fundamental component then the angle φ is the phase angle of the fundamental voltage.

In FIG. 6 (id, iq) are the components of grid current vector; (vq, vd) are the components of grid voltage vector in synchronous reference frame; where the d-axis of the frame is aligned along the grid voltage vector and cos φ and sin φ are the components of unit-vector.

FIG. 7 shows a high pass filler 18A that receives the three circulating current model signals defined in equations (29)-(31) from the circulating current representation forming module 16 and provides high passed filtered circulating current signals $(E_{R1}-E_{R2}2V_{CM})_{ac}$, $(E_{Y1}-E_{Y2}+2V_{CM})_{ac}$ and $(E_{B1}-E_{B2}+2V_{CM})_{ac}$ as an output to the circulating current control structure, where any dc components have been filtered out from these representations. The filter is thus set so that the fundamental and any harmonic frequency of circulating current representation is passed on and used in the control.

The circulating current control structure of the first circulating current control module 18 comprises a first control section 18B provided for the upper phase arms and a second control section 18C provided for the lower phase arms.

It can be seen that the first control section 18B comprises a fourth subtracting block 18D which receives half the modulation signal $m_R$ for the first phase leg on a negative terminal and the normalized filtered circulating current representation $(E_{R1}-E_{R2}+2V_{CM})_{ac,pu}$ for the first phase leg on a positive terminal, determines the difference and supplies it to a first adding block 18E. The first adding block 18E adds half the normalized nominal dc voltage $V_{dc\_nom,pu}$ to this difference in order to obtain a modified modulation signal $m_{R1}^*$ for use in the upper phase arm of the first phase leg. Thereby the modified modulation signal comprises a first circulating current reducing contribution. Here, $m_{R1}^*$ is a common modulating signal for all the cells in the upper arm of R-phase.

The normalization mentioned above is the normalization with respect to the nominal dc voltage $V_{dc,nom}$, which normalization is expressed as p.u. (per unit).

This means that the upper arm voltage can be expressed as follows:

$$V_{PR1}=m^*_{R1}*V_{dc,nom} \quad (36)$$

$$m^*_{R1}=-0.5m_R+0.5V_{dc,nom,pu}+(E_{R1}-E_{R2}+2V_{CM})_{ac,pu} \quad (37)$$

The first control section 18B also comprises a fifth subtracting block 18F which receives half the modulation signal my for the second phase leg on a negative terminal and the normalized filtered circulating current representation $(E_{Y1}-E_{Y2}+2V_{CM})_{ac,pu}$ for the second phase leg on a positive terminal, determines the difference and supplies it to a second adding block 18G. The second adding block 18G adds half the normalized nominal dc voltage $V_{dc\_nom,pu}$ to this difference in order to obtain a modified modulation signal $m_{Y1}^*$ for use in the upper phase arm of the second phase leg, where the modified modulation signal comprises a first circulating current reducing contribution. Again, $m_{Y1}^*$ is a common modulating signal for all the cells in the upper arm of Y-phase. The first control section 18B furthermore comprises a sixth subtracting block 18H which receives half the modulation signal $m_B$ for the third phase leg on a negative terminal and the filtered normalized circulating current representation $(E_{B1}-E_{B2}+2V_{CM})_{ac,pu}$ for the third phase leg on a positive terminal, determines the difference and supplies it to a third adding block 18J. The third adding block 18J adds half the normalized nominal dc voltage $V_{dc\_nom,pu}$ to this difference in order to obtain a modified modulation signal $m_{B1}^*$ for use in the upper phase arm of the third phase leg, where the modified modulation signal comprises a first circulating current reducing contribution. Again, $m_{B1}^*$ is a common modulating signal for all the cells in the upper arm of B-phase.

Similar expressions as defined in equations (36) and (37) may be determined for the upper phase arms of the second and third phase legs.

The second control section 18C in turn comprises a fourth adding block 18K which receives half the modulation signal $m_R$ for the first phase leg on a first terminal and half the normalized nominal dc voltage $V_{dc\_nom,pu}$ on a second terminal and adds them together in order to obtain a modified modulation signal $m_{R2}^*$ for use in the lower phase arm of the first phase leg.

This means that the lower arm voltage can be expressed as follows:

$$V_{R2N}=m^*_{R2}*V_{dc,nom} \quad (38)$$

$$m^*_{R2}=0.5m_R+0.5V_{dc,nom,pu} \quad (39)$$

The second control section 18C also comprises a fifth adding block 18L which receives half the modulation signal my for the second phase leg on a first terminal and half the normalized nominal dc voltage $V_{dc\_nom,pu}$ on a second terminal and adds them together in order to obtain a modified modulation signal $m_{Y2}^*$ for use in the lower phase arm of the second phase leg. The second control section 18C finally comprises a sixth adding block 18M which receives half the modulation index $m_B$ for the third phase leg on a positive terminal and half the normalized nominal DC voltage $V_{dc\_nom,pu}$ on a second terminal and adds them together in order to obtain a modified modulation index $m_{B2}^*$ for use in the lower phase arm of the third phase leg.

Similar expressions as defined in equations (38) and (39) may be determined for the lower phase arms of the second and third phase legs.

It can be seen that control signals are provided for phase legs where a waveforming control signal contribution is combined with a first circulating current control signal contribution emanating from the first circulating current control module and where the first circulating current control signal contribution is based on the circulating current representation, i.e. based on the modelling made of the circulating current in each phase leg. The waveforming control signal contribution is often expressed as a modulation reference that is used for the control of the phase arms. It can thereby also be seen that the circulating current control signal contribution is combined with a modulation reference used for one of the phase arms of the converter in order to obtain a modified voltage reference for controlling the phase arm to handle a circulating current while a waveshape is formed.

It can furthermore be seen that the circulating current representations are added to the upper phase arm voltage references using a feed forward loop for use in reducing the circulating currents.

It can thus be seen that based on the above derived mathematical representations of the circulating current, a feed-forward control is proposed to control the circulating currents. The ac components in $(E_{R1}-E_{R2}+2V_{CM})$ can thus be used as feedforward terms to eliminate the associated unwanted currents, as shown in FIG. 8. In FIG. 8 the first circulating current control signal contribution is combined with the upper phase arm voltage reference. However, it should be realized that the first circulating current control signal contribution can be combined with the voltage references of either upper or lower arms. It may in fact be combined with the voltage references of both the upper and lower phase arms. In this latter case the first circulating current control signal contribution may be distributed between the two phase arms It can be seen that the phase leg control retains the standard control in dq reference frame. However, conventional circulating current control that used measured phase arm currents is eliminated. Further, each cell is to be associated with a separate cell voltage controller, in addition to the control diagram shown in FIG. 8.

Aspects of the invention provide a new modelling method for modular-multilevel converters, where the expression for the exact 2nd harmonic voltage responsible for circulating currents is derived. Based on the derived representations, a feedforward controller is proposed where the 2nd harmonic component of the arm currents can be completely eliminated. The power loss due to circulating currents can thereby be reduced. Furthermore, standard voltage and current measurements are sufficient to implement the proposed controller. No special measurements are needed for the implementation of the circulating current control. Only measurements that normally exist in a converter are thus used. Cell voltage measurements are for instance often already used for cell voltage balancing purposes. Moreover, feedforward control is fast. The control is also easy to implement through addition of control software.

The reduction of the circulating current is thereby obtained fast with a sufficient accuracy only using the measurements needed for ordinary converter control, i.e. used for waveshape forming. The described circulating current reduction is thus obtained without requiring special current measurements.

There are a number of ways in which the invention can be varied.

The feedforward control described above was based on a converter employing half bridge cells. However the control can easily be adapted for a converter with full-bridge cells.

The proposed method of modelling can thus be extended for MMC employing full bridge cells, by rewriting equations (13) and (14) appropriately. One example is shown in (40) and (41), where $V_{cap-nom}$ is the nominal cell capacitor voltage of a full-bridge cell and n is the number of full-bridge cells per arm.

$$\Delta V_{PR1} = nV_{cap-nom} - \Sigma V_{cap-PR1} \quad (40)$$

$$\Delta V_{R2N} = nV_{cap-nom} - \Sigma V_{cap-R2N} \quad (41)$$

Similar expressions can of course also be derived for the second and third phase legs.

This means that equations (30), (32) and (33) will look the same.

However, equations (31), (34) and (35) would be changed into:

$$E_{R1} - E_{R2} + 2V_{CM} = -\frac{(m_{cm} + m_R)}{2}\left(\sum V_{cap-R2N} - \sum V_{cap-PR1}\right) + \frac{1}{2}\left(2nV_{cap\_nom} - \sum V_{cap-PR1} - \sum V_{cap-R2N}\right) \quad (42)$$

$$E_{Y1} - E_{Y2} + 2V_{CM} = -\frac{(m_{cm} + m_Y)}{2}\left(\sum V_{cap-Y2N} - \sum V_{cap-PY1}\right) + \frac{1}{2}\left(2nV_{cap\_nom} - \sum V_{cap-PY1} - \sum V_{cap-Y2N}\right) \quad (43)$$

$$E_{B1} - E_{B2} + 2V_{CM} = -\frac{(m_{cm} + m_B)}{2}\left(\sum V_{cap-B2N} - \sum V_{cap-BR1}\right) + \frac{1}{2}\left(2nV_{cap\_nom} - \sum V_{cap-BR1} - \sum V_{cap-B2N}\right) \quad (44)$$

One observation that may be made is that also in this case the modelled circulating current is based on a difference between a nominal dc voltage of at least one of the phase arms and both the sums of cell voltages. It can more particularly be seen that in this case the nominal dc voltage is a nominal cell capacitor voltage $V_{cap-nom}$ times the number of cells (2n) of the phase leg.

It is also possible that the converter has parallel phase arms in each phase leg. There may thus be two or more parallel upper phase arms and two or more parallel lower phase arms in a phase leg. Such a converter may be used when it is desirable to increase the power rating of the converter.

Among two parallel-arms there could be circulating current, as it is difficult to match the instantaneous voltage of the parallel arms. This problem magnifies if a cell/cells of one of the parallel-arms is by-passed due to a fault.

With the above mentioned method of modelling, the common-mode voltage $V_E$ (see equation 7), can be expressed as a function of 12-arm voltages (assuming there are two arms connected in parallel). As this method efficiently captures the information of each cell present in the entire converter, by employing proper feed-forward terms, the circulating current present between various possible loops in the converter system are effectively mitigated.

In case one of a pair of parallel arms is denoted A and the other B, then one way in which equation (7) could be modified is:

$$V_E = \frac{V_{dc}}{2} + \frac{1}{12}[V_{PR1A} + V_{PY1A} + V_{PB1A}] + \frac{1}{12}[V_{PR1B} + V_{PY1B} + V_{PB1B}] - \frac{1}{12}[V_{R2NA} + V_{Y2NA} + V_{B2NA}] - \frac{1}{12}[V_{R2NB} + V_{Y2NB} + V_{B2NB}] \quad (45)$$

This in turn could lead to equation (30) being rewritten as:

$$E_{R1} - E_{R2} + 2V_{CM} = -\frac{(m_{cm} + m_R)}{4}(\Delta V_{PR1(A)} - \Delta V_{R2N(A)}) - \frac{(m_{cm} + m_R)}{4}(\Delta V_{PR1(B)} - \Delta V_{R2N(B)}) + \frac{1}{4}(\Delta V_{PR1(A)} + \Delta V_{R2N(A)} + \Delta V_{PR1(B)} + \Delta V_{R2N(B)}) \quad (46)$$

Figure 9:
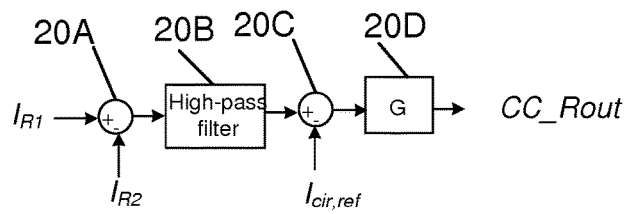

It may in some cases be desirable to combine the feed forward control with conventional circulating current control. Such conventional circulating current control is performed by the second circulating current control module 20 of the control unit 12. FIG. 9 shows one realization of a part of this module for the first phase leg and FIG. 10 how the signals from three such parts are to be combined with the circulating current control structure of the first circulating current control module 18.

The second circulating current control unit 20 comprises three branches, one for each phase leg and the branch provided for the first phase leg is shown in FIG. 9. The branch comprises a seventh subtracting block 20A receiving the measured upper phase arm current $I_{R1}$ on a positive terminal and the measured lower phase arm current $I_{R2}$ on a negative terminal and provides the current difference to a high pass filter 20B, which is set to let the fundamental and harmonic frequencies pass. It thus filters away dc components. The high pass filtered current difference is then supplied to the positive terminal of an eighth subtracting block 20C. The eighth subtracting block 20C also has a negative terminal on which it receives a circulating current reference $I_{cir,ref}$. The eighth subtracting block 20C then determines the difference between the high-pass filtered current difference and the circulating current reference and provides this determined difference to a proportional control block 20D, which amplifies the difference between the high pass filtered current difference and the circulating current reference $I_{cir,ref}$ with a gain G in order to obtain a second circulating current control signal contribution CC_Rout. Similar branches are provided for the second and third phase legs in order to obtain corresponding second circulating current control signal contributions CC_Yout and CC_Bout.

Figure 10:
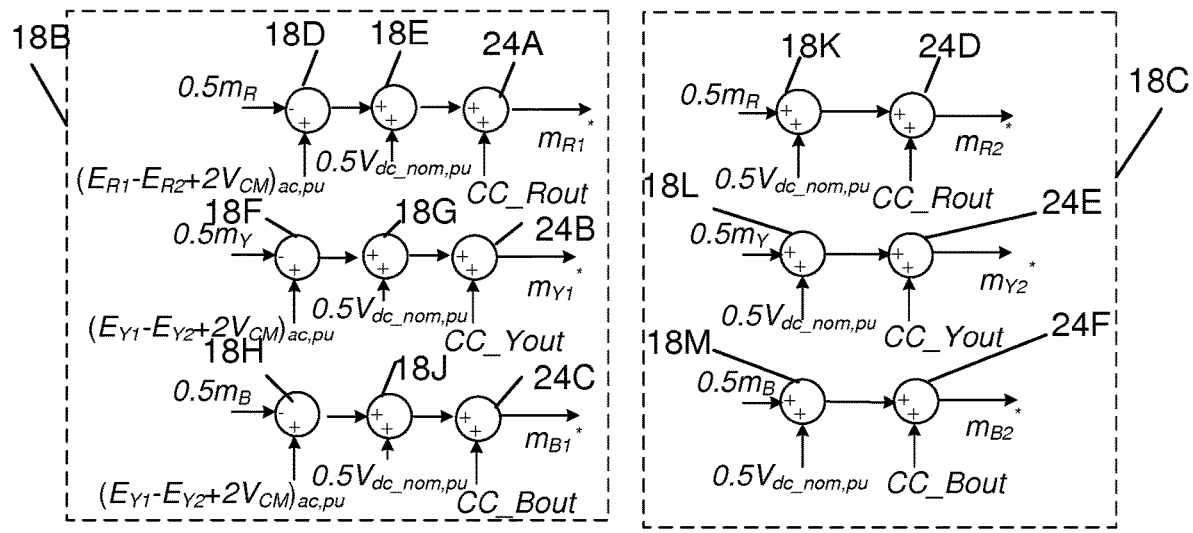

The changes made in relation to the circulating current control structure of the first circulating current control module can be seen in FIG. 10. It can here be seen that the first adding block 18E is connected to a seventh adding block 24A, that the second adding block 18G is connected to an eighth adding block 24B, the third adding block 18J is connected to a ninth adding block 24C, the fourth adding block 18K connected to a tenth adding block 24D, the fifth adding block 18L connected to an eleventh adding block 24E and the sixth adding block connected to a twelfth adding block 24F.

Here the operation of the subtracting and adding blocks 18D-18M is the same as that described earlier. However instead of the first-sixth adding blocks 18E, 18G, 18J, 18K, 18L and 18M supplying modulation signals or modulation references to phase arms, they instead supply the sums they have been calculating to a first terminal of the corresponding seventh, eighth, ninth, tenth, eleventh or twelfth adding block 24A-24F, which receives the corresponding current control signal contribution CC_Rout, CC_Yout, CC_Bout on a second terminal. The seventh adding block 24A provides the sum it calculates as the modified modulation index $m_{R1}$* for use in the upper phase arm of the first phase leg, the eighth adding block 24B provides the sum it calculates as the modified modulation index $m_{Y1}$* for use in the upper phase arm of the second phase leg, the ninth adding block 24C provides the sum it calculates as the modified modulation index $m_{B1}$* for use in the upper phase arm of the third phase leg, the tenth adding block 24D provides the sum it calculates as the modified modulation index $m_{R2}$* for use in the lower phase arm of the first phase leg, the eleventh adding block 24E provides the sum it calculates as the modified modulation index $m_{Y2}$* for use in the lower phase arm of the second phase leg and the twelfth adding block 24F provides the sum it calculates as the modified modulation index $m_{B2}$* for use in the lower phase arm of the third phase leg.

It can thereby be seen that the waveshape control signal contribution is combined with a first feedforward circulating current control signal contribution and a second conventional circulating current control signal contribution. It is naturally also here possible to combine the first circulating current control signal contribution with the modulating signal used for the upper phase arm, the lower phase arm or both.

Simulations have been made for the controller in FIGS. 9 and 10. In the simulations the converter is a FB MMC rated for 1270 MW connected to a star-delta transformer on the ac side (1350 MVA). The voltage on the grid-side (star side) is equal to 400 kV while the voltage on the converter side (delta side) is equal to 325 kV. The nominal dc pole-to-pole voltage is equal to 500 kV. To load the converter, a resistance is connected on the dc side as a 1000 MW load.

Figure 11:
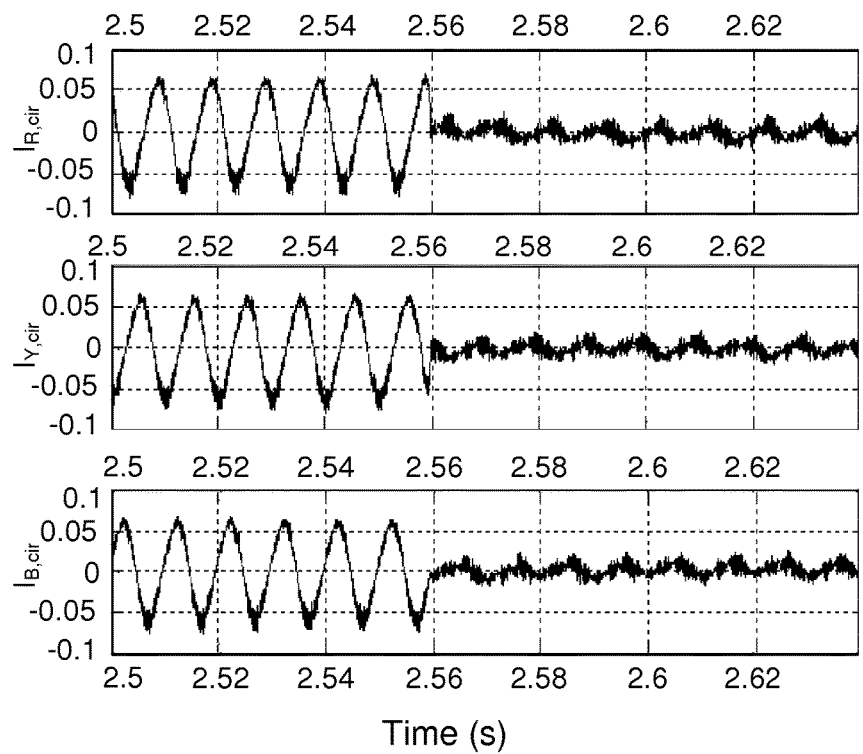
FIG. 11 shows simulations of the circulating currents for two cases of circulating current control.
Figure 12:
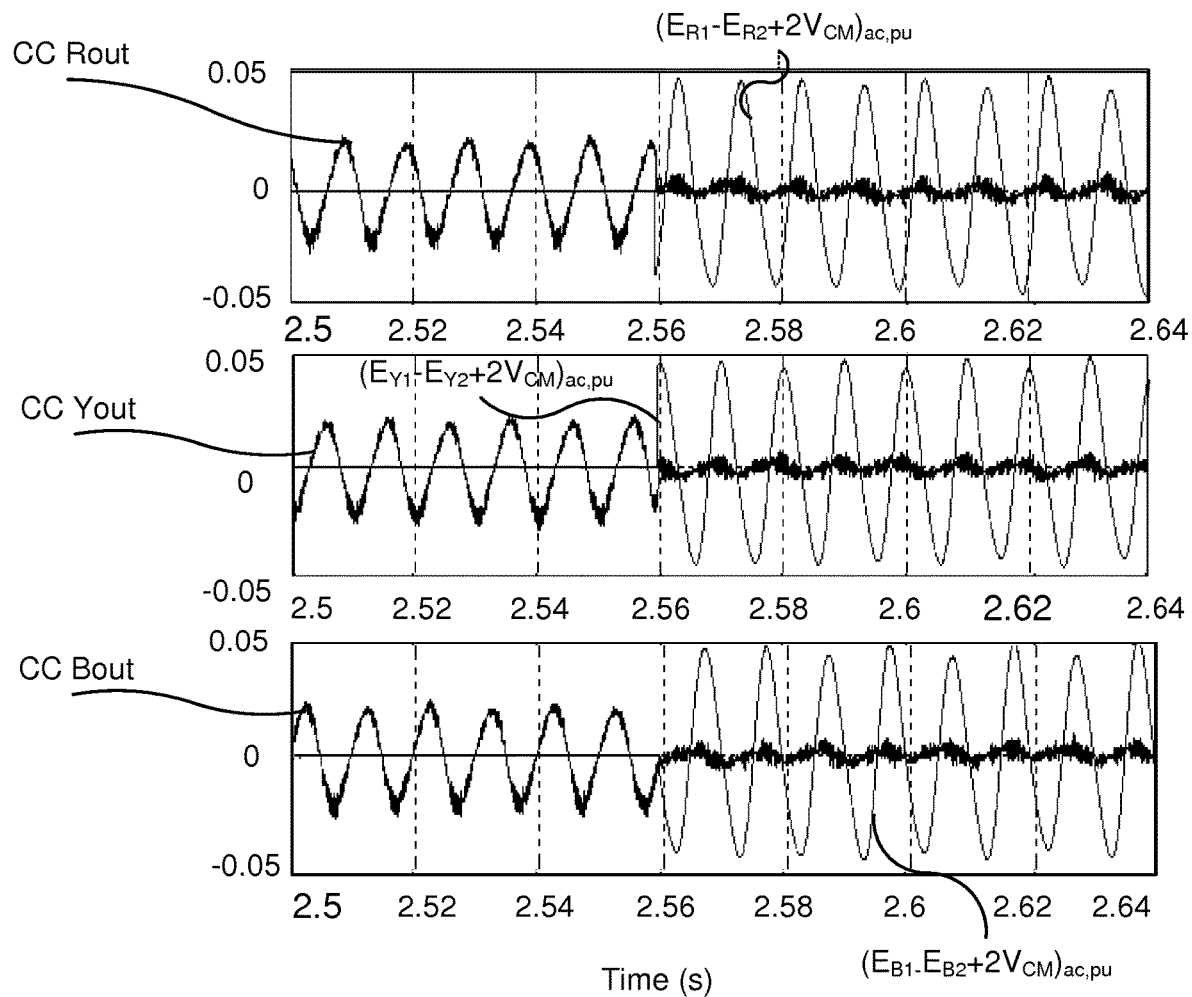
FIG. 12 shows simulations of circulating current control signal contributions for the two cases of circulating current control, and FIG. 13 schematically shows a computer program product in the form of a data carrier comprising computer program code for implementing the control unit.

Some simulation results are presented in FIGS. 11 and 12, where FIG. 11 shows the circulating currents $I_{R,cir}$, $I_{Y,cir}$ and $I_{B,cir}$ in the kA range for the three phases R, Y and B and FIG. 12 shows the first circulating current control signal contributions $(E_{R1}-E_{R2}+2V_{CM})_{ac,pu}$, $(E_{Y1}-E_{Y2}+2V_{CM})_{ac,pu}$ and $(E_{B1}-E_{B2}+2V_{CM})_{ac,pu}$ as well as the second circulating current control signal contributions CC_Rout, CC_Yout and CC_Bout for the three phases R; Y and B. The simulations are furthermore provided for two cases. The two cases considered are as follows:

Case1: Standard circulating current controller (second circulating current control module) alone [$(E_{R1}-E_{R2}+2V_{CM})_{ac,pu}$ in FIG. 10 equal to zero], shown between time 2.5 and 2.56 s in FIGS. 11 and 12.

Case2: Standard circulating current controller+Feed-forward controller (first circulating current control module), shown between times 2.56 and 2.64 in FIGS. 11 and 12.

It can be clearly observed in FIG. 11 that the feed-forward controller, as an addition to the existing circulating current controller, completely eliminates the 2nd harmonic component of the circulating current. Only high-frequency current components are still present.

It can be seen in FIG. 12 that the feedforward control accurately calculates the 2nd harmonic voltage responsible for the circulating currents. Once it is activated, the role of standard circulating current controller is restricted only to handle the high-frequency current components. Similar results can be obtained with different controller gains of the existing circulating current controller and the FF controller acts as a supplementary controller along with the existing circulating current controller to provide very low amount of circulating current in the arms of the converter.

In the proposed feedforward control, the modulating signals represent the quantities that are averaged over a sampling time interval. Hence the feedforward controller cannot be considered to be acting on instant by instant basis; rather acting on an average basis. This could be one of the reasons why this controller in some cases may need to be combined with a conventional circulating current controller.

In the examples given above the model was used to reduce circulating currents.

It should be realised that the control may additionally or instead be used to introduce circulating currents. It may for instance be used for introducing positive and negative sequence circulating currents. If for instance fourth harmonic positive sequence currents are to be injected in the upper phase arm, then the first control section 18B of FIG. 8 or 10 may comprise a further block for each phase leg that incorporates a further control signal contribution in the upper arm references $m_{R1}$*, $m_{Y1}$* and $m_{B1}$*. Such a contribution may be obtained adding a subtracting block after the adding blocks 18E, 18G and 18J. The contribution may be based on the equation 30, 32, 33 (or 31, 34, 35) in the case of half bridge cells or 42, 43 and 44 (or 30, 32, 33) in the case of full bridge cells. The contribution may also be filtered, such as high pass filtered for removing dc components, as well as scaled down, for instance to half the value, so that only the fourth harmonic components of a suitable size are included. In case second harmonic negative sequence currents are to be added in the lower phase arm, then the second control section 18C of FIG. 8 or 10 may be similarly adjusted through including a further adding block after the adding blocks 18K, 18L and 18M, where these additional adding blocks add a further control signal contribution for inclusion in the lower arm references $m_{R2*}$, $m_{Y2}$* and $m_{B2}$*. The contribution may be formed in the same way as was described for the positive sequence circulating current. It should here be realized that it is just as well possible to, in addition or instead, add positive sequence circulating currents to the lower phase arm and negative sequence circulating currents to the upper phase arm.

Through adding circulating currents, such as positive and negative sequence currents, it is possible to achieve a number of further advantages such as to reduce cell voltage ripple and to increase the reactive power compensating capability of the converter.

It should be realized that it is also possible to use the injection of circulating currents without any of the circulating current reduction performed by the first and/or the second circulating current control modules.

Figure 13:
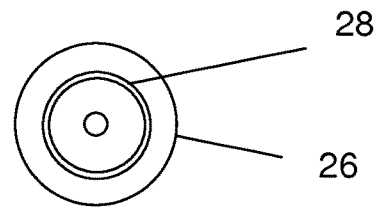

The control unit may be realized in the form of discrete components. However, it may also be implemented in the form of a processor with accompanying program memory comprising computer program code that performs the desired control functionality when being run on the processor. A computer program product carrying this code can be provided as a data carrier such as one or more CD ROM discs or one or more memory sticks carrying the computer program code, which performs the above-described control functionality when being loaded into a control unit of a voltage source converter. One such data carrier in the form of a CD Rom disk 26 carrying computer program code 28 is shown in FIG. 13.

From the foregoing discussion it is evident that the present invention can be varied in a multitude of ways. It shall consequently be realized that the present invention is only to be limited by the following claims.

The invention claimed is:

1. A modular multilevel voltage source converter comprising:
   a number of phase legs, each of the phase legs comprising an upper and a lower phase arm comprising cells with energy storage elements; and
   a control unit operative to:
      model a circulating current in one of the phase legs using a first expression ($\Delta_{VPR1}$, $\Sigma V_{cap-PR1}$), a second expression ($\Delta_{VR2N}$, $\Sigma V_{cap-R2N}$) and at least one modulation signal ($m_R$, $m_{cm}$), where the first expression comprises the sum of cell voltages measured in the upper phase arm $\Sigma V_{cap-PR1}$ and the second expression comprises the sum of cell voltages measured in the lower phase arm $\Sigma V_{cap-R2N}$;
      determine a circulating current control signal ($E_{R1}-E_{R2}+2V_{CM}$) for the one of the phase legs through the circulating current modelling without measuring the circulating current in the one of the phase legs; and
      combine the circulating current control signal as a feed forward signal with a modulation signal used for one phase arm of the phase arms thereby obtaining a modified modulation signal controlling the one phase arm of the phase arms to reduce or introduce a circulating current while a waveshape is formed, wherein the at least one modulation signal comprises the modulation signal used for the one phase arm of the phase arms.

2. The voltage source converter according to claim 1, wherein the control unit is operative to model the circulating current of the one of the phase legs using a difference between the two expressions (($\Delta V_{PR1}-\Delta V_{R2N}$), ($\Sigma V_{cap-R2N}-\Sigma V_{cap-PR1}$)).

3. The voltage source converter according to claim 2, wherein the control unit is operative to model the circulating current of the one of the phase legs through multiplying the difference between the two expressions with the at least one modulation signal.

4. The voltage source converter according to claim 1, wherein the control unit is operative to model the circulating current of the one of the phase legs using a sum of the two expressions (($\Delta V_{PR1}+\Delta V_{R2N}$), ($\Sigma V_{cap-PR1}+\Sigma V_{cap-R2N}$)).

5. The voltage source converter according to claim 1, wherein the control unit is operative to determine the circulating current control signal based on a difference between a nominal dc voltage of at least one phase arm of the phase arms and both the sums of cell voltages.

6. The voltage source converter according to claim 5, wherein the cells are half bridge cells and the difference is the difference between a nominal dc voltage ($V_{dc,nom}$) of the one of the phase legs and both sums of cell voltages.

7. The voltage source converter according to claim 5, wherein the cells are full bridge cells and the difference comprises a difference between a nominal cell capacitor voltage ($V_{cap-nom}$) times a number of cells of the one of the phase legs and both sums of cell voltages.

8. The voltage source converter according to claim 1, wherein the control unit is operative to use the circulating current control signal ($E_{R1}-E_{R2}+2V_{CM}$) in the control of the upper phase arm, the lower phase arm or both of the phase arms.

9. The voltage source converter according to claim 1, further comprising more than one upper phase arm and more than one lower phase arm in one of the phase legs, where the upper phase arms of the one of the phase legs are connected in parallel with each other and the lower phase arms of the one of the phase legs are connected in parallel with each other.

10. The voltage source converter according to claim 1, wherein the circulating current control signal that is based on the sum of cell voltages in the upper phase arm $\Sigma V_{cap-PR1}$ of the one of the phase legs, the sum of cell voltages in the lower phase arm $\Sigma V_{cap-R2N}$ of the one of the phase legs and at least one modulation signal comprises a first circulating current control signal ($E_{R1}-E_{R2}+2V_{CM}$) and the control unit, when combining the first circulating current control signal with the modulation signal is operative to subtract the first circulating current control signal from the modulation signal for reducing circulating currents in the one of the phase legs.

11. The voltage source converter according to claim 10, the control unit being further operative to determine a second circulating current control signal using a difference between a current difference and a circulating current reference, where the current difference is the difference between measured phase arm currents of the one of the phase legs, and combine the second circulating current control signal with the modulation signal for reducing circulating currents.

12. The voltage source converter according to claim 1, wherein the circulating current control signal that is based on the sum of cell voltages in the upper phase arm $\Sigma V_{cap-PR1}$ of the one of the phase legs, the sum of cell voltages in the lower phase arm $\Sigma V_{cap-R2N}$ of the one of the phase legs and at least one modulation signal comprises an injection contribution and the control unit is operative to add the circulating current control signal to the modulation signal for introducing at least one of positive or negative sequence circulating currents in the one of the phase legs.

13. A method of handling circulating currents in a modular multilevel voltage source converter comprising a number of phase legs, each comprising an upper and a lower phase arm comprising cells with energy storage elements, the method being performed in a control unit of the voltage source converter and comprising:
   modelling a circulating current in one of the phase legs using a first expression ($\Delta_{VPR1}$, $\Sigma V_{cap-PR1}$), a second expression ($\Delta V_{R2N}$, $\Sigma V_{cap-R2N}$) and at least one modulation signal, where the first expression comprises the sum of cell voltages measured in the upper phase arm $\Sigma V_{cap\text{-}PR1}$ and the second expression comprises the sum of cell voltages measured in the lower phase arm $\Sigma V_{cap\text{-}R2N}$;

determining a circulating current control signal ($E_{R1} - E_{R2} + 2V_{CM}$) for the one of the phase legs through the circulating current modelling without measuring the circulating current in the one of the phase legs; and combining the circulating current control signal as a feed forward signal with a modulation signal used for one phase arm of the phase arms thereby obtaining a modified modulation signal controlling the one phase arm of the phase arms to reduce or introduce a circulating current while a waveshape is formed, wherein the at least one modulation signal comprises the modulation signal used for the one phase arm of the phase arms.

14. The method according to claim 13, wherein the modelling comprises modelling the circulating current of the one of the phase legs using a difference between the two expressions (($\Delta V_{PR1} - \Delta V_{R2N}$), ($\Sigma V_{cap\text{-}R2N} - \Sigma V_{cap\text{-}PR1}$)).

15. The method according to claim 14, wherein the modelling comprises multiplying the difference between the two expressions with the at least one modulation signal.

16. The method according to claim 13, wherein the modelling comprises modelling the circulating current of the one of the phase legs using a sum of the two expressions (($\Delta V_{PR1} + \Delta V_{R2N}$), ($\Sigma V_{cap\text{-}PR1} - \Sigma V_{cap\text{-}R2N}$)).

17. The method according to claim 13, wherein the circulating current control signal that is based on the sum of cell voltages in the upper phase arm $\Sigma V_{cap\text{-}PR1}$ of the one of the phase legs, the sum of cell voltages in the lower phase arm $\Sigma V_{cap\text{-}R2N}$ of the one of the phase legs and at least one modulation signal ($m_R$, $m_{em}$) comprises a first circulating current control signal ($E_{R1} - E_{R2} + 2V_{CM}$) and the combining of the first circulating current control signal with the modulation signal comprises subtracting the first circulating current control signal from the modulation signal for reducing circulating currents in the one of the phase legs.

18. The method according to claim 17, further comprising determining a second circulating current control signal using a difference between a current difference and a circulating current reference, where the current difference is the difference between measured phase arm currents of the one of the phase legs, and further comprising combining the modulation signal also with the second circulating current control for reducing the circulating currents.

19. A non-transitory computer readable media for handling circulating currents in a modular multilevel voltage source converter comprising a number of phase legs, each comprising an upper and a lower phase arm comprising cells with energy storage elements, the non-transitory computer readable media comprising a data carrier with computer program code configured to cause a control unit of the voltage source converter to:

model a circulating current in one of the phase legs using a first expression ($\Delta_{VPR1}$, $\Sigma V_{cap\text{-}PR1}$), a second expression ($\Delta_{VR2N}$, $\Sigma V_{cap\text{-}R2N}$) and at least one modulation signal, where the first expression comprises the sum of cell voltages measured in the upper phase arm $\Sigma V_{cap\text{-}PR1}$ and the second expression comprises the sum of cell voltages measured in the lower phase arm $\Sigma V_{cap\text{-}R2N}$;

determine a circulating current control signal ($E_{R1} - E_{R2} + 2V_{CM}$) for the one of the phase legs through the circulating current modelling without measuring the circulating current in the one of the phase legs; and combine the circulating current control signal as a feed forward signal with a modulation signal used for one phase arm of the phase arms thereby obtaining a modified modulation signal controlling the one phase arm of the phase arms to reduce or introduce a circulating current while a waveshape is formed, wherein the at least one modulation signal comprises the modulation signal used for the one phase arm of the phase arms.

20. The non-transitory computer readable media according to claim 19, wherein the computer program code is configured to cause a control unit of the voltage source converter to model the circulating current of the one of the phase legs using a difference between the two expressions (($\Delta V_{PR1} - \Delta V_{R2N}$), ($\Sigma V_{cap\text{-}R2N} - \Sigma V_{cap\text{-}PR1}$)).

21. The non-transitory computer readable media according to claim 19, wherein the computer program code configured to cause a control unit of the voltage source converter to model the circulating current of the one of the phase legs using a sum of the two expressions ($\Delta V_{PR1} + \Delta V_{R2N}$), ($\Sigma V_{cap\text{-}PR1} + \Sigma V_{cap\text{-}R2N}$)).

* * * * *

UNITED STATES PATENT AND TRADEMARK OFFICE
CERTIFICATE OF CORRECTION

PATENT NO. : 10,924,029 B2  
APPLICATION NO. : 16/329670  
DATED : February 16, 2021  
INVENTOR(S) : Jaldanki Page 1 of 1

It is certified that error appears in the above-identified patent and that said Letters Patent is hereby corrected as shown below:

In the Claims

In Column 19, Line 35, Claim 1, delete "$(\Delta_{VR2N}, \sum V_{cap-R2N})$," and insert --$(\Delta V_{R2N}, \sum V_{cap-R2N})$--.

In Column 22, Line 13, Claim 19, delete "$(\Delta_{VR2N}, \sum V_{cap-R2N})$," and insert --$(\Delta V_{R2N}, \sum V_{cap-R2N})$--.

Signed and Sealed this  
Twenty-fifth Day of May, 2021

Drew Hirshfeld  
*Performing the Functions and Duties of the*  
*Under Secretary of Commerce for Intellectual Property and*  
*Director of the United States Patent and Trademark Office*